| United States Patent [19] | [11] | 4,433,098 |
|---|---|---|
| Itoh et al. | [45] | Feb. 21, 1984 |

[54] PROCESS FOR PREPARING A COPOLYMER AQUEOUS SOLUTION FROM WHICH A CATALYST RESIDUE IS REMOVED

[75] Inventors: Hiroyuki Itoh; Teruaki Yamanashi; Hirosuke Imai, all of Yokohama, Japan

[73] Assignee: Nippon Oil Co., Ltd., Japan

[21] Appl. No.: 312,821

[22] Filed: Oct. 19, 1981

[30] Foreign Application Priority Data

Oct. 23, 1980 [JP] Japan .................................. 55-148518

[51] Int. Cl.$^3$ ............................................... C08F 6/08
[52] U.S. Cl. .................................... 524/811; 528/500
[58] Field of Search .................. 528/500; 526/272; 524/549, 811

[56] References Cited

U.S. PATENT DOCUMENTS

| 3,505,300 | 4/1970 | Galloway | 528/500 |
|---|---|---|---|
| 3,527,741 | 9/1970 | Hattori | 528/500 |
| 3,773,727 | 11/1973 | Gaylord | 526/272 |
| 3,856,760 | 12/1974 | Fontana | 526/272 |
| 4,168,359 | 9/1979 | Gaylord | 526/272 |
| 4,316,977 | 2/1982 | Gude | 526/272 |

*Primary Examiner*—Paul R. Michl
*Attorney, Agent, or Firm*—Ostrolenk, Faber, Gerb & Soffen

[57] ABSTRACT

A process involves preparing an aqueous solution of a diolefin-maleic anhydride copolymer prepared by solution polymerization, said aqueous solution being free of tetramethylsuccinonitrile (TMSN), a by-product resulting from the decomposition of azobisisobutyronitrile (AIBN) used as a polymerization initiator for the copolymerization of the diolefin-maleic anhydride copolymer. The aqueous solution free of TMNS is obtained without the separation of the copolymer from the polymerization liquid in which the copolymer was prepared. The process is composed of the two distillation steps, the first distillation being for the removal of a solvent for polymerization and the second distillation being for the removal of water as well as TMSN. The first and second distillation steps can be carried out in a continuous or discontinuous manner. The first distillation step is carried out after and/or during the addition of water or a basic aqueous solution, and the second distillation can be effected with or without the addition of such liquid. This process is particularly effective for removal of TMSN which is highly toxic and causes problems from the safety point of view.

13 Claims, No Drawings

PROCESS FOR PREPARING A COPOLYMER AQUEOUS SOLUTION FROM WHICH A CATALYST RESIDUE IS REMOVED

BACKGROUND OF THE INVENTION

I. Field of the Invention

The present invention relates to a process for preparing an aqueous copolymer solution from which is removed the residue of a catalyst. More particularly, it relates to a process for preparing an aqueous solution of a copolymer from which is removed tetramethylsuccinonitrile (hereinafter referred to as "TMSN"), that is, a residue formed as a by-product in the decomposition of azobisisobutyronitrile (hereinafter referred to as "AIBN") in preparing the copolymer aqueous solution, without separating the copolymer from a polymerization liquid in which a diolefin-maleic anhydride copolymer is synthesized by means of solution polymerization using AIBN as a polymerization initiator.

II. Brief Description of the Prior Art

Maleic anhydride series copolymers have gained a special position as useful water-soluble polymers because of their characteristic properties with respect to easy modification, ready solubility in water and easily varied physical properties with variation in the copolymerizable monomers used. Among such copolymers, diolefin-maleic anhydride copolymers are useful copolymers possessing various possibilities because the double bonds remain in the molecule, in addition to residues of the maleic anhydride used, and the double bonds can be utilized for modification or cross-linkage. Maleic anhydride series copolymers are generally synthesized by means of slurry polymerization or solution polymerization in a water-insoluble solvent using a radical polymerization initiator such as a peroxide or an azo compound. However, it is known that, where diolefin-maleic anhydride copolymers are synthesized by the slurry polymerization method in which the polymers produced are caused to precipitate during polymerization, the polymers are gelled. Accordingly, the soluble polymer can be produced only by the solution polymerization method.

Where diolefin-maleic anhydride copolymers are employed as water-soluble polymers, they are usually employed in the form of an aqueous solution of the copolymer which is obtained by reacting the copolymer with water for the conversion of maleic anhydride residues into maleic acid residues to render the copolymer soluble in water, or by reacting the copolymer with a base such as sodium hydroxide or the like for the conversion of the maleic anhydride residues into the maleic acid salt residues to render the copolymer soluble in water. Where such an aqueous copolymer solution is prepared from the diolefin-maleic anhydride copolymer synthesized by means of solution polymerization, the desired aqueous solution may be obtained on a small scale by pouring the polymerization liquid into a barren solvent of the copolymer to separate the copolymer for purification and then reacting the resultant copolymer with water or with sodium hydroxide or the like in water. These procedures, however, present disadvantages in that a large amount of the solvents is required, and the operation is laborious so that they are difficult to practice industrially. In order to obtain the aqueous copolymer solution on an industrial scale, it is desired to provide a process for preparing the aqueous solution directly from the polymerization liquid without separating the copolymer produced from the polymerization liquid in which the copolymerization was carried out. However, the drawback encountered by such a procedure is that it is difficult to provide an aqueous copolymer solution from which unreacted monomers, reaction by-products and residues of a catalyst used are removed from the polymerization liquid in which copolymerization is effected.

Although AIBN is cheap in cost, stable and high in safety, it is hard to remove TMSN, that is a by-product resulting from the decomposition of AIBN when the solution polymerization is effected with the aid of AIBN as a radical polymerization initiator. As TMSN is high in toxicity, the use of the aqueous copolymer solution from which TMSN is not sufficiently removed is restricted from the safety point of view. Accordingly, the removal of TMSN always presents a big problem where an aqueous solution of a diolefin-maleic anhydride copolymer is prepared directly from the polymerization liquid in which the copolymerization is carried out.

SUMMARY OF THE INVENTION

Therefore, an object of the present invention is to provide a process for preparing an aqueous solution of a diolefin-maleic anhydride copolymer which is highly safe to use.

Another object of the present invention is to provide a process for preparing such an aqueous copolymer solution directly from a polymerization liquid without the separation of the copolymer produced, said liquid being a liquid in which the copolymer is prepared by means of solution polymerization.

A further object of the present invention is to provide a process for preparing such an aqueous copolymer solution directly from the polymerization liquid without the separation of the copolymer produced but with the removal of TMSN from the copolymer aqueous solution to a sufficient extent.

In accordance with one aspect of the present invention, there is provided a process for preparing an aqueous solution of a diolefin-maleic anhydride copolymer prepared by solution polymerization with the residual material or residue of a catalyst removed from a polymerization liquid without the separation of the copolymer produced therefrom, comprising the steps of adding water or a basic aqueous solution to a polymerization liquid in which the copolymer is prepared, distilling the polymerizing solvent, and then distilling water as well as tetramethylsuccinonitrile (TMSN) with or without the further addition of water or the basic aqueous solution.

DETAILED DESCRIPTION OF THE PREFERRED EMBODIMENTS

The process in accordance with the present invention involves removing tetramethylsuccinonitrile (TMSN), a by-product residue resulting from the decomposition of a catalyst, azobisisobutyronitrile (AIBN), from a polymerization liquid in which a diolefin-maleic anhydride copolymer is synthesized by the solution polymerization method using AIBN, whereby an aqueous solution of the copolymer is prepared directly from the polymerization liquid without the separation of the copolymer produced.

The process in accordance with the present invention comprises the steps of adding water or a basic aqueous solution to the polymerization liquid, distilling the polymerizing solvent, and then carrying out distilling with or without the addition of water or the basic aqueous solution to remove TMSN and water.

In accordance with the invention, after the copolymerization of a diolefin with maleic anhydride is completed in a polymerization liquid by the solution polymerization method, water or a basic aqueous solution is added to the polymerization liquid and then the copolymerizing solvent is removed by distillation. As the addition of water or the basic aqueous solution such as sodium hydroxide, ammonia or the like prior to or during the distillation step permits the hydrolysis of the copolymer to render it soluble in water, the operation is rendered easy because the copolymer remains in the form of a liquid as an aqueous solution even when a majority of the solvent is removed. The addition of water or the basic aqueous solution may be carried out by adding a predetermined amount thereof at once or at a constant rate during distillation. Where water or the like is added at once, there may be an instant when the diolefin-maleic anhydride copolymer precipitates out in the solid form in the liquid because the copolymer is itself insoluble in water; it is rendered soluble in water through reaction with water or the like. No problem arises with precipitation of the copolymer, because the copolymer in the solid form dissolves as the hydrolysis proceeds. However, it is preferable to gradually add the water or the like to the copolymer at a constant rate during distillation so as not to cause precipitation, because this procedure presents the advantage that the operation can be constantly carried out in the form of a liquid. In order to distill off the polymerizing solvent from a polymerization liquid to which water or the like has been added, the polymerizing solvent to be employed may preferably include one having a boiling point lower than that of water or capable of being azeotropically distilled with water so as to be distilled off prior to the water distillation. Suitable representatives of such solvents may be, for example, a ketone such as acetone, methyl ethyl ketone, cyclohexanone or the like; an ether such as tetrahydrofuran, dioxane or the like; or an ester such as ethyl acetate, methyl acetate or the like. In instances where the solvent is distilled off, water may be distilled together with the solvent. Although it is preferable to remove all of the solvent, no problem occurs even if a small amount of the solvent remains undistilled.

The amount of water to be added is not particularly restricted as long as it is at least equimolar with respect to the maleic anhydride residues present in the copolymer molecule to effect hydrolysis. Where it is desired to provide an aqueous copolymer solution as a distillation residue without causing the copolymer to precipitate out in the solid form after the distillation of the solvent, it is preferable to use a large excess of water or a basic aqueous solution.

In accordance with the present invention, the diolefin-maleic anhydride copolymer aqueous solution produced by the distillation of the solvent is further subjected to distillation, whereby TMSN is distilled off along with water. In this distillation step, since the aqueous copolymer solution is concentrated and its viscosity becomes high as the distillation proceeds, it is preferable that water or the same type basic aqueous solution as the one employed for the distillation of the solvent may be added prior to or during this distillation step in order to maintain the concentration of the copolymer in the aqueous copolymer solution in a desired range in which the operation can be readily conducted. The addition may be made in a continuous or dropwide manner. This distillation step to remove TMSN through the distillation of water can be carried out continuously subsequent to the distillation step for the removal of the polymerizing solvent. In the actual distillation step where the polymerizing solvent has a boiling point lower than that of water, the solvent is initially distilled off as a distillate liquid, and the water is distilled off. In instances where a solvent capable of being azeotropically distilled with water is employed, a liquid having an azeotropic composition of water and the solvent is first distilled off, and then the water is distilled off after the completion of the distillation of the solvent. The liquid composition of the initial distillate liquid varies with the kind of polymerizing solvent, or the efficiency of distillation, and the shelf number of a distilling tower. What is required to accomplish the objects of the present invention is to additionally distill off water from the aqueous solution obtained by the distillation of the solvent from the polymerization liquid in which the diolefin and maleic anhydride are copolymerized by the solution polymerization method; this additional distillation is required to remove TMSN from the polymerization liquid. Although a very small amount of TMSN is removed during the distillation of the polymerizing solvent, most of the TMSN is removed together with water through the distillation of water from the polymerization liquid from which the solvent has been removed. It has not been known to remove TMSN through the distillation of water from the aqueous solution of the diolefin-maleic anhydride copolymer from which the solvent is already distilled off, and this is the characteristic feature of the present invention. As the amount of water to be distilled off during the subsequent distillation step is determined in accordance with the amount of TMSN contained in the aqueous solution, and as the amount of the TMSN varies with the amount of AIBN used for polymerization and with the polymerization conditions such as temperature, time and the like, the amounts thereof should be determined in accordance with the conditions of each system. In general, when water is distilled off in an amount ranging from 100 to 10,000 times the amount of TMSN present in the aqueous solution, almost all the TMSN is removed from the aqueous solution.

Although the procedures as mentioned hereinabove can provide an aqueous solution of the copolymer from which is removed TMSN, that is a by-product resulting from the decomposition of AIBN, there is no limitation on the manner in which distillation is effected, and an efficient and economical procedure can be chosen in accordance with a given situation.

For example, where a batch system using one distiller is applied, the procedure may comprise first removing substantially all of the polymerizing solvent by distillation after the addition of water or a basic aqueous solution to the polymerization liquid, and then continuing the distillation procedure, with or without the addition thereto of water or the basic aqueous solution, to distill off water and TMSN.

Where a continuous operation is carried out using two distillers, the procedure may comprise the steps of continuously feeding water or the basic aqueous solution to the polymerization liquid in the first distiller, continuously withdrawing the aqueous solution of the copolymer while the solvent is distilled off, continuously charging the aqueous copolymer solution in the second distiller, and distilling off water and TMSN by distillation in the second distiller, whereby the product aqueous solution of the copolymer is continuously withdrawn.

A continuous operation using one distiller can also be carried out. In this case, a multi-stage distilling tower is used in which the polymerization liquid and water or the basic aqueous solution are charged at the middle portion of the tower, and the solvent is distilled off at the middle to upper portions of the tower with water and TMSN distilled off at the middle to lower portions of the tower, whereby the product aqueous solution of the copolymer is continuously withdrawn from the bottom or beneath the tower.

The diolefin-maleic anhydride copolymer referred to in accordance with the present invention may include copolymers of a conjugated diene such as butadiene, isoprene, chloroprene, 2,3-dimethylbutadiene, 2,3-dichlorobutadiene, piperylene, 2-methyl-1,3-hexadiene, 1-methoxy-1,3-butadiene or the like with maleic anhydride; or copolymers of a non-conjugated diene such as vinylcyclohexane, vinylnorbornene, dicyclopentadiene, 1,5-hexadiene or the like with maleic anhydride.

Where these copolymers are synthesized by the solution polymerization method to give a polymerization liquid from which the aqueous copolymer solution directly results, the application of the process in accordance with the present invention can provide a highly safe aqueous solution because the highly toxic TMSN is removed.

EXAMPLE 1

Using 10 grams of AIBN, 162 grams of butadiene and 294 grams of maleic anhydride, the copolymerization of the butadiene and maleic anhydride was effected at 80° C. for 4 hours in 2,500 cc of acetone. The resultant polymerization liquid was transferred to a glass distilling apparatus equipped with a stirrer, a thermometer and a dropping funnel, and the solvent was distilled off. The distillation was carried out with 1,500 grams of water being added continuously immediately after the distillation of the acetone up to the completion of distillation. The compositions of the distillates and the TMSN concentrations were measured by means of gas chromatographic analysis. It was found thereby that the compositions of the distillates varied from acetone alone, through a mixture of acetone with water, to water alone as the distillation proceeded. The boiling points of the distillates also varied in accordance with the variation in the distillate composition. When the acetone solvent alone was distilled off, little TMSN was detected in the distillate. As the amount of water increased in the distillate, TMSN was detected. The TMSN concentration in the aqueous solution remaining in the distilling apparatus at the time of the completion of distillation of the acetone was found to be 670 p.p.m. To this residual aqueous solution was added 1,000 grams of water, and the distillation was further continued. When the amount of water distilled off reached about 1,000 grams, the distillation was completed to provide an aqueous solution of the copolymer as a residual material. It was found that the TMSN concentration in the aqueous solution was 12 p.p.m.

EXAMPLE 2

Using 5 grams of AIBN, 180 grams of isoprene and 294 grams of maleic anhydride, the copolymerization of isoprene with maleic anhydride was conducted at 70° C. for 7 hours in 2,500 cc of methyl ethyl ketone. The resultant polymerization liquid was transferred to an apparatus as employed in Example 1 and heated to 50° C. To this liquid was added 1,500 grams of water with stirring, and the mixture was further stirred for another 2 hours. The mixture was then heated to distill off the solvent. The compositions of the distillates and the TMSN concentrations were measured by means of gas chromatographic analysis. While an azeotropic mixture of water with methyl ethyl ketone was distilled off, only traces of TMSN were detected in the distillate. The TMSN concentration in the aqueous copolymer solution remaining at the time of the completion of distillation of the azeotropic mixture was found to be 420 p.p.m. The distillation was further continued after the addition of 500 grams of water, and the distillation was completed when the amount of water distilled off reached about 500 grams. The TMSN concentration in the aqueous solution remaining as residual material was found to be 8 p.p.m.

EXAMPLE 3

Using 5 grams of AIBN, 266 grams of chloroprene and 294 grams of maleic anhydride, the copolymerization was conducted at 80° C. for 4 hours in 3,000 cc of tetrahydrofuran. The resultant polymerization liquid was transferred to an apparatus as employed in Example 1 and stirred at 50° C. for 2 hours while 4,000 grams of water was gradually added thereto. The mixture was then heated to distill off the tetrahydrofuran. The TMSN concentration in the aqueous copolymer solution obtained was found to be 530 p.p.m. The distillation was further continued and the distillation was completed when the amount of water distilled off reached about 2,000 grams. No TMSN was detected in the product aqueous copolymer solution after the aforesaid treatment.

EXAMPLE 4

Using 2.5 grams of AIBN, 162 grams of butadiene and 294 grams of maleic anhydride, the copolymerization was conducted at 70° C. for 7 hours in 3,000 cc of cyclohexanone. The resultant polymerization liquid was transferred to an apparatus as employed in Example 1 and stirred at 100° C. for 2 hours while 1,000 grams of a sodium hydroxide aqueous solution containing 120 grams of sodium hydroxide was gradually added thereto. The mixture was then subjected to distillation for removal of an azeotropic mixture of water with cyclohexanone. The cyclohexanone was removed while water was added during distillation. The amount of the aqueous solution remaining in the apparatus at the time of the completion of distillation of the cyclohexanone was 3,100 grams, and the TMSN concentration in the aqueous solution was found to be 120 p.p.m. The distillation was further continued after the addition of 1,000 grams of water, and was completed when the amount of water distilled off amounted to about 1,000 grams. No TMSN was detected in the resultant aqueous solution.

COMPARATIVE EXAMPLE 1

The procedures of Example 1 were followed to copolymerize butadiene and maleic anhydride. The resultant polymerization liquid was subjected to distillation to completely remove the acetone, and the remainder was dried to give a solid material. The solid material was then dissolved in 2,000 grams of water containing 180 grams of sodium hydroxide. The resultant aqueous solution was found by measurement to contain a high TMSN concentration of 790 p.p.m.

What is claimed is:

1. A process for preparing an aqueous solution of a butadiene-maleic anhydride copolymer from the polymerization liquid in which solution polymerization was carried out in the presence of azobisisobutyronitrile as a catalyst, which comprises the steps of:

adding water or a basic aqueous solution to the polymerization liquid;

distilling the polymerization solvent used for the solution polymerization; and then distilling water and tetramethylsuccinonitrile with or without the addition of water or the basic aqueous solution.

2. A process according to claim 1, wherein the polymerizing solvent has a boiling point lower than that of water or is capable of being azeotropically distilled with water prior to water distillation.

3. A process according to claim 2 in which the water added to the polymerization liquid is at least equimolar with respect to the maleic anhydride residues present in the copolymer molecule.

4. A process according to claim 3, wherein in the step of distilling water and tetramethylsuccinonitrile, water is distilled off in an amount ranging from 100 to 10,000 times the amount of tetramethylsuccinonitrile present in the polymerization liquid.

5. A process according to claim 4, wherein water or the basic aqueous solution is added during or prior to the distillation of the polymerizing solvent.

6. A process according to claim 5, wherein water or the basic aqueous solution is added prior to or during the step of distilling water and tetramethylsuccinonitrile.

7. A process according to claim 6, wherein an aqueous solution of the copolymer is recovered containing substantially no tetramethylsuccinonitrile catalyst decomposition by-product.

8. A process according to claim 1, wherein an aqueous solution of the copolymer is recovered containing substantially no tetramethylsuccinonitrile catalyst decomposition by-product.

9. A process according to claim 1, wherein the basic aqueous solution is a solution in water of sodium hydroxide or ammonia.

10. A process according to claim 1, wherein the distillation of water as well and tetramethylsuccinonitrile is continuously or discontinuously conducted after the distillation of the solvent used for copolymerization.

11. A process according to claim 1, wherein in the step of distilling water and tetramethylsuccinonitrile, water is distilled off in an amount ranging from 100 to 10,000 times the amount of the tetramethylsuccinonitrile present in the polymerization liquid.

12. A process according to claim 1, wherein water or the basic aqueous solution is added prior to or during the step of distilling water and tetramethylsuccinonitrile.

13. A process according to claim 1, wherein water or the basic aqueous solution is added during or prior to the distillation of the polymerizing solvent.

* * * * *